United States Patent
Field

(10) Patent No.: US 10,432,581 B2
(45) Date of Patent: Oct. 1, 2019

(54) NETWORK IDENTIFICATION AS A SERVICE

(71) Applicant: Smartpipe Technologies Ltd, London (GB)

(72) Inventor: Tanya May Field, London (GB)

(73) Assignee: Smartpipe Technologies Ltd, London (GB)

(*) Notice: Subject to any disclaimer, the term of this patent is extended or adjusted under 35 U.S.C. 154(b) by 1 day.

(21) Appl. No.: 15/555,292

(22) PCT Filed: Oct. 14, 2016

(86) PCT No.: PCT/GB2016/053198
§ 371 (c)(1),
(2) Date: Sep. 1, 2017

(87) PCT Pub. No.: WO2017/064511
PCT Pub. Date: Apr. 20, 2017

(65) Prior Publication Data
US 2018/0063076 A1  Mar. 1, 2018

(30) Foreign Application Priority Data
Oct. 14, 2016 (GB) .................. 1518195.1

(51) Int. Cl.
*G06F 15/16* (2006.01)
*H04L 29/12* (2006.01)
(Continued)

(52) U.S. Cl.
CPC ...... *H04L 61/2053* (2013.01); *H04L 61/2007* (2013.01); *H04L 61/2061* (2013.01);
(Continued)

(58) Field of Classification Search
CPC ............. H04L 61/2053; H04L 61/2007; H04L 61/2061; H04L 67/2804; H04L 67/2838
(Continued)

(56) References Cited

U.S. PATENT DOCUMENTS

2003/0233329 A1  12/2003  Laraki et al.
2006/0265737 A1*  11/2006  Morris ................ H04L 63/0823
726/3
(Continued)

FOREIGN PATENT DOCUMENTS

AU  2000002089  1/2001
AU  2002221336  6/2002
(Continued)

OTHER PUBLICATIONS

International Search Report dated Jan. 3, 2017 for PCT Application No. PCT/GB2016/053198.
(Continued)

*Primary Examiner* — Philip B Tran
(74) *Attorney, Agent, or Firm* — EIP US LLP

(57) ABSTRACT

Certain examples described herein make use of an intermediate network device (110) in a service provider network (104) to enable the modification of network requests to provide enhanced functionality. These examples use a rotating network identifier that is inserted into a network request that is receivable by a server device (108) located outside of the service provider network (104). An association between the network identifier and data originating from the service provider network may be effected via a mapping that exists for the predefined time period. In certain examples, a data broker (114) is introduced within the telecommunications network (100). The data broker (114) may be configured based on the aforementioned mapping between the network identifier and data originating from the service provider
(Continued)

network. The data broker is adapted to use the mapping to provide data to the server device (108). This may be considered network identification as a service as the data broker (114) is configured to supply data originating from within the service provider network as a computing service to the server device (108).

19 Claims, 8 Drawing Sheets

(51) Int. Cl.
*H04L 29/08* (2006.01)
*H04L 29/06* (2006.01)

(52) U.S. Cl.
CPC .......... *H04L 63/08* (2013.01); *H04L 67/2804* (2013.01); *H04L 67/288* (2013.01); *H04L 67/2838* (2013.01); *H04L 67/306* (2013.01); *H04L 67/303* (2013.01)

(58) Field of Classification Search
USPC .................................................. 709/245, 220
See application file for complete search history.

(56) References Cited

U.S. PATENT DOCUMENTS

| | | | |
|---|---|---|---|
| 2007/0094283 A1 | 4/2007 | Fung et al. | |
| 2008/0255944 A1 | 10/2008 | Shah et al. | |
| 2011/0173071 A1 | 7/2011 | Meyer et al. | |
| 2013/0132544 A1 | 5/2013 | Krishnan et al. | |
| 2013/0144954 A1* | 6/2013 | Li | H04L 67/28 709/205 |
| 2014/0201323 A1* | 7/2014 | Fall | H04L 67/10 709/217 |
| 2015/0019952 A1 | 1/2015 | Grant et al. | |
| 2015/0039728 A1 | 2/2015 | Alcatel | |

FOREIGN PATENT DOCUMENTS

| | | |
|---|---|---|
| AU | 2002221336 A5 | 6/2002 |
| EP | 2629553 A1 | 8/2013 |
| GB | 2473753 A | 3/2011 |
| GB | 2503285 A | 12/2013 |
| WO | 0248899 A | 6/2002 |
| WO | 2006081680 A1 | 8/2006 |
| WO | 13120694 A2 | 8/2013 |
| WO | 20130190334 A2 | 12/2013 |
| WO | 13120694 A3 | 1/2014 |

OTHER PUBLICATIONS

GB Search Report dated Jun. 13, 2016 for GB Application No. GB1518195.1.
Jonathan Mayer: "How Verizon's Advertising Header Works", Oct. 24, 2014, webpolicy.org. http://webpolicy.org/2014/10/24/how-verizons-advertising-header-works/.

* cited by examiner

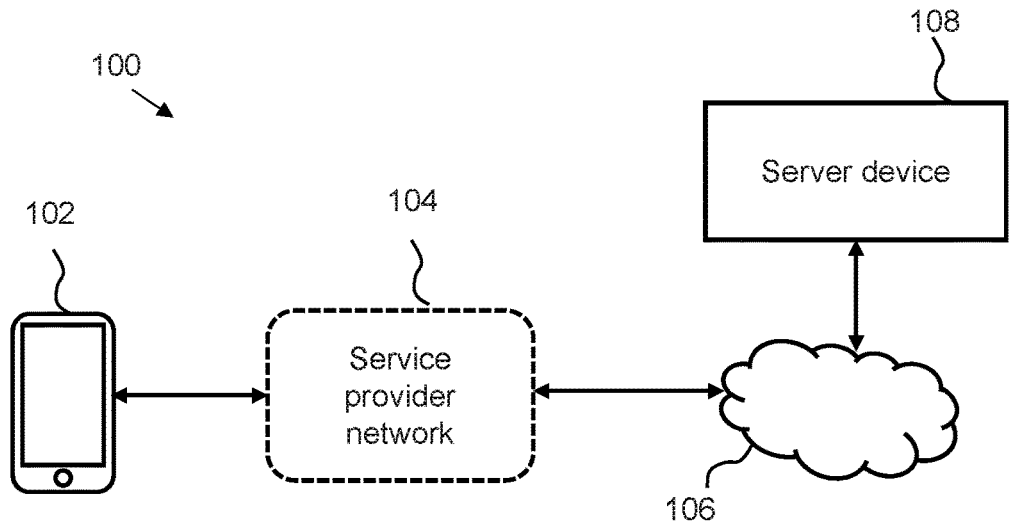
**FIG. 1A – *Prior Art***
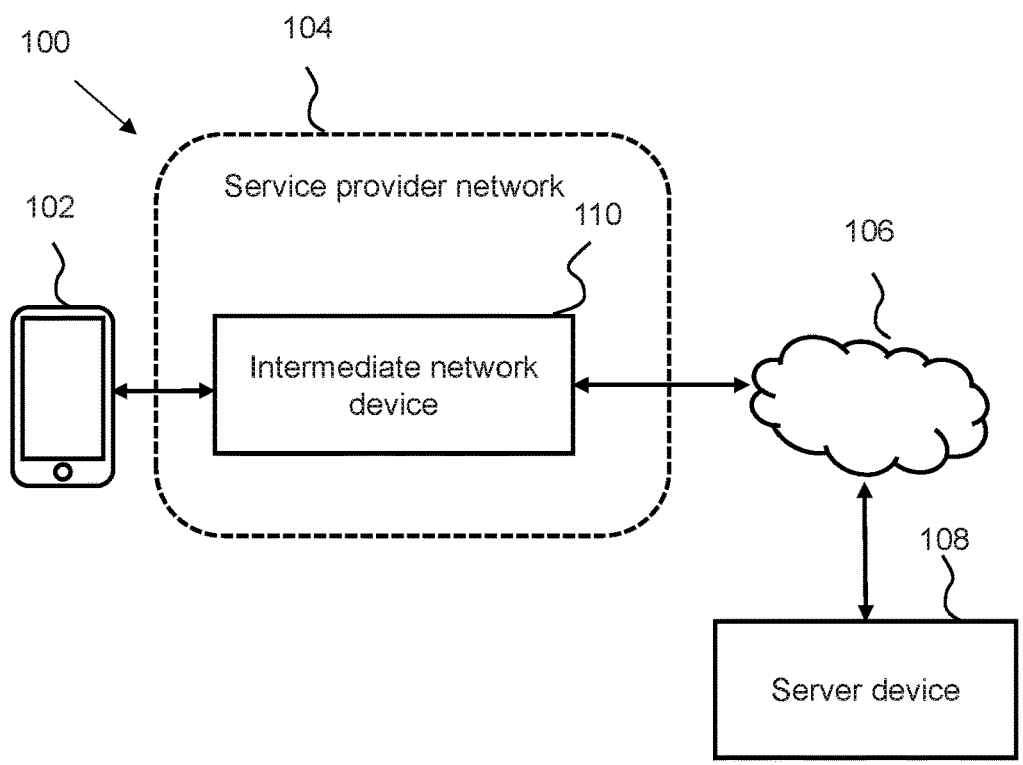
**FIG. 1B – *Prior Art***

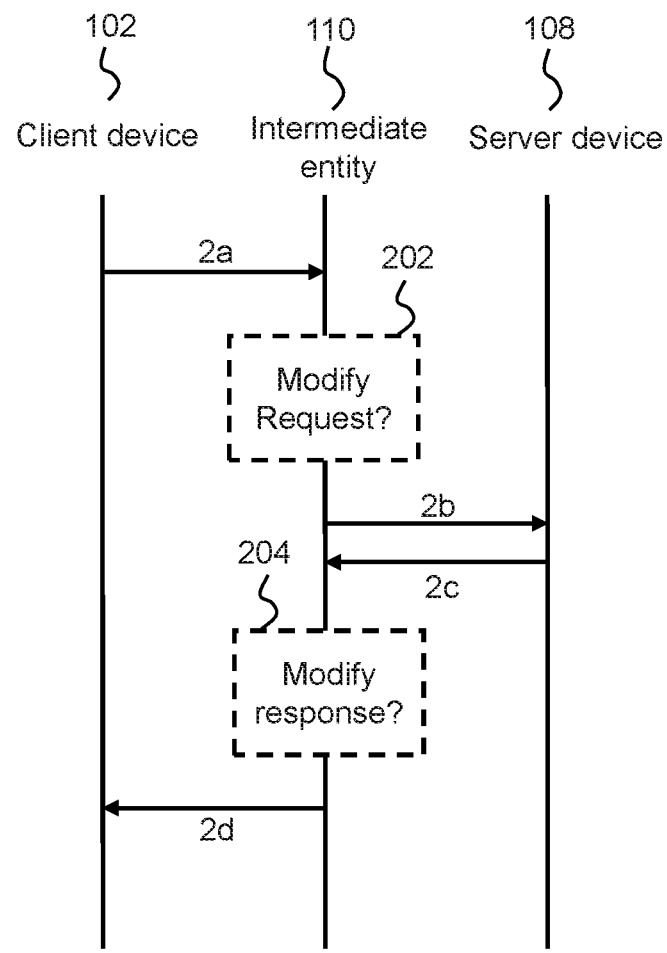
FIG. 2 – *Prior Art*

NETWORK IDENTIFICATION AS A SERVICE

CROSS-REFERENCE TO RELATED APPLICATIONS

This application is a U.S. national stage entry under 35 U.S.C. § 371 of PCT International Patent Application No. PCT/GB2016/053198, filed Oct. 14, 2016, which claims priority to United Kingdom Application No. GB1518195.1, filed Oct. 14, 2015. The contents of the aforementioned applications are incorporated herein by reference in their entirety.

TECHNICAL FIELD

The present invention relates to network communications. In particular, but not exclusively, the present invention relates to processing network requests in a telecommunications network to enable data provision.

BACKGROUND

Users who wish to access data stored at a remote location and/or remote computer-implemented services typically do so via a telecommunications network, such as the Internet. In order to transmit and receive data via a telecommunications network, users conventionally subscribe to a telecommunications service provided by a telecommunications service provider. A telecommunications service typically provides access to a wider telecommunications network for a given subscriber client device, a group of subscriber client devices, or a residential or commercial premises network associated with a given subscriber. The service provider network typically performs subscriber authentication and comprises a routing fabric for routing traffic between an authenticated subscriber and the wider telecommunications network. A service provider may comprise a carrier, a mobile network operator (MNO), a wireless network operator or an internet service provider (ISP). Subscriber client devices may include personal computers, laptop computers, mobile telephones (including "smart phones"), tablet computers, personal digital assistants, etc.

FIG. 1A shows a simplified example of a telecommunications network 100. A subscriber client device 102 may initially access a service provider network 104 of the telecommunications network 100, which contains various entities provisioned by the service provider. A service provider network 104 for a carrier or a mobile network operator may comprise at least one of: a Global System for Mobile Communications (GSM) network and a Universal Mobile Telecommunications System (UMTS) network, e.g. implementing one of the Long-Term Evolution (LTE) standards. In certain cases, the service provider network 104 may comprise a radio access network and a core network, e.g. as coupled by one or more service edge components. The radio access network may comprise one or more base stations (such as node base-stations—NBs—or enhanced node base-stations—eNBs). User equipment (such as mobile telephones, so-called smartphones, laptops and tablets, amongst others) may attach to the core network via the radio access network. The core network may comprise a serving gateway, a packet data network gateway and a gateway general packet radio service (GPRS) support node. User equipment may connect to other public packet switched networks, e.g. the Internet, via the core network of the service provider. Service provider entities may be responsible for authentication of subscribers/subscriber client devices, access management, billing, etc. This may be performed in association with a home subscriber server or user profile server function (or an authentication centre for GSM) within the service provider network 104. In this manner, the service provider network 104 typically acts as a gateway between subscriber client device 102 and a wider network 106, such as the public internet. The wider network 106 is, at least in part, used to route data between service provider network 104 and one or more server devices 108.

Telecommunications network 100 may also comprise a number of further network parts (not shown), and a number of border/gateway/caching entities (not shown) used to translate between the various network protocols used in each network part where necessary, cache and serve commonly-accessed data so as to reduce load between network parts, and/or manage access to each network part.

Access to data and/or computer-implemented services via telecommunications network 100 is typically enabled using browser software or other applications (hereinafter "a browser") on subscriber client device 102. Other applications on subscriber client device 102 may include games or software utilities that also require access to content via telecommunications network 100. For example, some applications accrue revenue by displaying content to their users. Such content is typically regularly updated and hosted at a server device in telecommunications network 100. The application may therefore require access to the server device via telecommunications network 100 in order to obtain up-to-date content to display to its users.

A browser enables subscriber client device 102 to take part in a browser session, which comprises a series of one or more requests and responses made to and received from one or more remote entities, such as server device 108, via telecommunications network 100. A browser may be used to view web pages, obtain files, conduct services such as instant messaging, etc. via telecommunications network 100. Browser session requests and responses typically comprise one or more data packets. Such packetized data is formatted and transported according to one or more network protocols, used in a given part of the network.

In patent publication WO 2013190334, an intermediate network device 110 is introduced into service provider network 104 between subscriber client device 102 and wider network part 106. This is shown in FIG. 1B. Intermediate network device 110 may be physically located in service provider network 104, or logically located in service provider network 104 through the use of, for example, a virtual or backhaul private network, but physically located/hosted elsewhere. Service provider network 104 may be adapted to route browser session traffic between subscriber client device 102 and wider network part 106 via intermediate network device 110.

Intermediate network device 110 may be configured to modify a browser session request or a browser session response. For example, FIG. 2 illustrates the operation of intermediate network device 110 in the context of a browser session taking place between subscriber client device 102 and server device 108. At step 2a, a browser session request is transmitted from subscriber client device 102 into telecommunications network 100. The browser session request of step 2a could comprise a request for a web page, web page element, data file, service, etc. As service provider network 104 is configured to route all browser session traffic via intermediate network device 110, the browser session request is then received at intermediate network device 110 in the service provider network.

Having received the browser session request in step 2a, intermediate network device 110 then processes the received browser session request according to the one or more browser session processing modification rules. As a result of the processing, intermediate network device 110 may modify the received browser session request at step 202. Having processed the browser session request, the processed browser session request is then transmitted, in step 2b, to server device 108.

Upon receipt of the browser session request transmitted in step 2b, server device 108 processes the browser session request in order to generate a corresponding browser session response. At step 2c, server device 108 transmits the generated browser session response into telecommunications network 100, directed at subscriber client device 102. As service provider network 104 is configured to route all browser session traffic via intermediate network device 110, upon entering service provider network 104, the browser session response of step 2c is then received at intermediate network device 110 in service provider network 104.

Having received the browser session request in step 2c, intermediate network device 110 then processes the received browser session response according to the one or more browser session processing modification rules. As a result of the processing, intermediate network device 110 may modify the received browser session response at step 102. Having processed the browser session response, the processed browser session response is then transmitted, in step 2d, to subscriber client device 102.

Some browser sessions may contain a series of multiple browser session requests and browser session responses. This will be the case, for example, if the subscriber browses to multiple web pages consecutively in the given browser session. Often, a series of multiple requests and responses will be required to view a single web page. This is particularly true if different elements of the web page are hosted at different server entities and/or if the web page or service is implemented dynamically, e.g. if HyperText Markup Language (HTML) data is generated in real-time by server device 108 following receipt of a request using one or more server functions. A common example is encountered when a web page includes one or more advertisement elements.

The examples above give an outline of methods and systems for processing browser sessions in a telecommunications network. However, it is an object of the present invention to provide improved methods and systems for communicating over a telecommunications network.

SUMMARY

Aspects of the present invention are set out in the appended independent claims. Further examples and variations are set out in the appended dependent claims.

Further features and advantages of the invention will become apparent from the following description of preferred examples of the invention, given by way of example only, which is made with reference to the accompanying drawings.

BRIEF DESCRIPTION OF THE DRAWINGS

FIGS. 1A and 1B are schematic system diagrams showing a telecommunications system according to the prior art;
FIG. 2 is a flow diagram showing a method of processing browser sessions according to the prior art.

DETAILED DESCRIPTION

Figure 3:
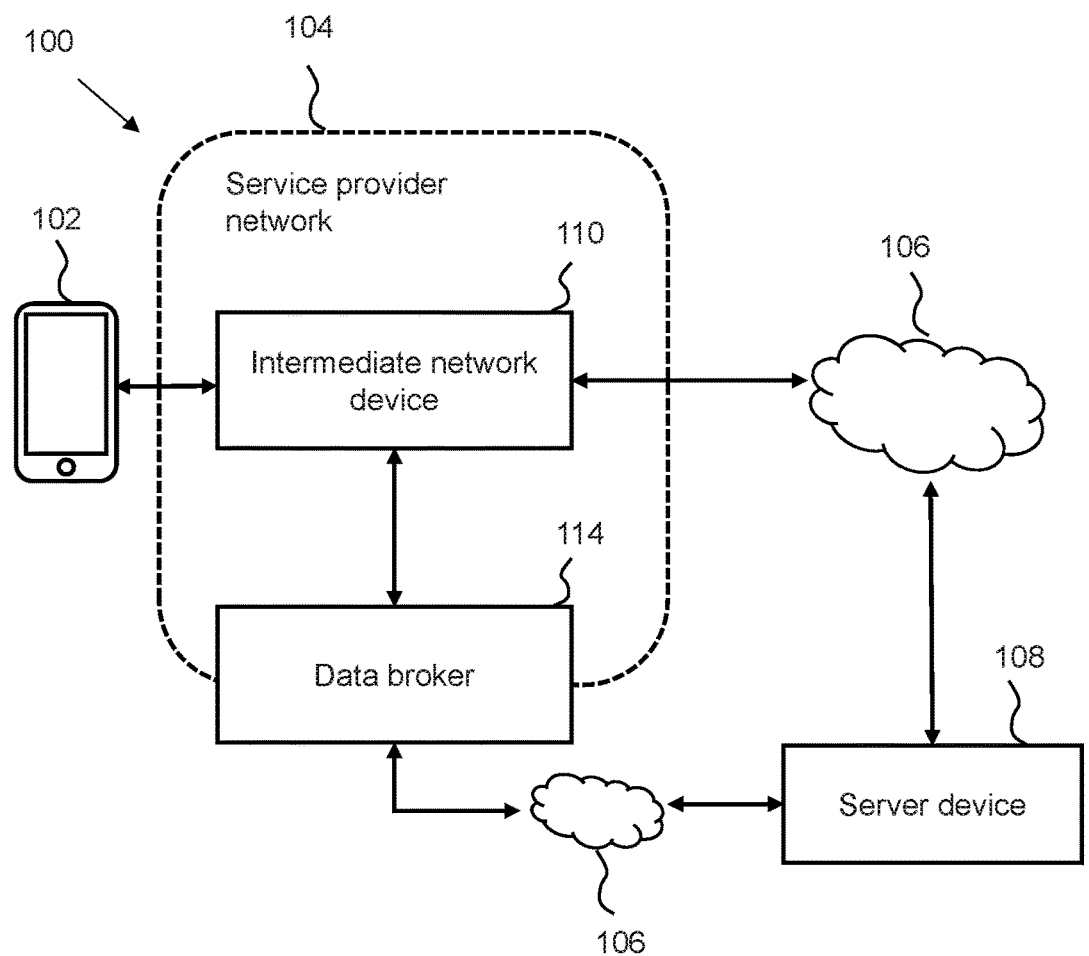
FIG. 3 is a schematic system diagram showing components of a telecommunications system according to examples.

Certain examples described herein make use of an intermediate network device in a service provider network between a plurality of subscriber client devices and the wider network, whereby to enable the modification of network requests to provide enhanced functionality. In particular, certain examples described herein enhance communications made by a subscriber client device to enable information exchange between a service provider network and server entities in the wider network. As such, certain examples described herein effectively add a layer of state to stateless protocols used for communication. This may result in enhanced usability for a subscriber, e.g. actions may be performed transparently over the wider network by way of background information exchange. Certain examples may reduce a need for a subscriber to enter information to authenticate or identify themselves to server entities outside of the service provider network. Moreover, information exchange may be provided in a secure and anonymous manner. For example, information exchange may be provided in a manner that cannot be tracked by malicious third parties and without disclosing private and/or confidential information over public networks.

Certain examples described herein use a rotating network identifier that is inserted into a network request that is receivable by a server entity located outside of the service provider network, e.g. the server entity may have an address on a public network such as a public Internet Protocol (IP) address. The network identifier may be rotating in that it is selected from a group or pool of available network identifiers, wherein the network identifier is returned to the group or pool of available network identifiers on expiry of a predefined time period. As such, the rotating network identifier is time-limited. The network identifier may comprise a random string, e.g. alphanumeric characters that do not in themselves comprise data retrieved from within the service provider network. Association or correlation with data originating from the service provider network, e.g. private data from that network, may be effected via a mapping that exists for the predefined time period (i.e. a one-time mapping). In one case, this mapping may comprise at least a tuple pairing the network identifier and a subscriber identifier (e.g. an associative array). Use of a one-time rotating network identifier may provide anonymity when the network request is transmitted across public networks, e.g. even if the network request is intercepted it is not possible to determine an association or correlation with a particular subscriber or a particular data characteristic.

In certain examples described herein, an additional entity is introduced within the telecommunications network. This entity is referred to herein as a "data broker". The data broker may comprise a server, i.e. a computing device configured to process computer program code implementing a server functionality, which is adapted to supply data to a server device outside of the service provider network. The data broker may be configured based on the aforementioned mapping between the network identifier and data originating from the service provider network. For example, in one implementation, the data broker is securely coupled to the service provider network, e.g. via a virtual or backhaul private network, but is also accessible from outside the service provider network, e.g. is connected to the Internet and/or has a public IP address or uniform resource locator. The data broker is adapted to use the mapping to provide data to a server device outside of the telecommunications network. Data provision may take place on a push and/or pull basis, e.g. where data provision is initiated by the data broker ("push") or in response to a request from the server device acting as a client to the data broker ("pull"). In one implementation, the server device may receive the network identifier as part of the network request and then communicate the network identifier to the data broker. The data broker is then arranged to use the mapping to determine appropriate data originating from within the service provider network to send to the server device.

Certain examples described herein may be considered "network identification as a service" as the data broker is configured to supply data originating from within the service provider network as a computing service to the server device, e.g. the server device operates as a client for services provided by the data broker, wherein the data broker operates as a server. This functionality may have many varied applications. In one case, the data broker may provide authentication of a user of a subscriber client device, avoiding or reducing the need for the user to send data to the server device to authenticate themselves. For example, this may be used by an e-banking network application or a provider of medical advice content. In another case, the data broker may provide information regarding the user, such as a home address, client device characteristics, demographic information and/or user preferences. For example, a server device implementing an e-commerce website may receive network requests from the subscriber client device that comprise the network identifier. The server device may then request, or be configured to receive, data associated with the subscriber, such as a delivery address and/or payment information from the data broker based on the network identifier. The server device may then populate data fields for the website based on the received data associated with the subscriber. This then greatly facilitates interaction with the server device as the user does not need to manually enter the data requested from the data broker. Moreover, it facilitates data entry on mobile devices, e.g. those accessing a carrier or mobile network, where the user interface may be limited and/or the user may be operating the subscriber client device while performing other tasks, e.g. walking and/or outside of a home environment where the required information is not available. In yet another example, data indicating network usage patterns may be returned by the data broker. This may be used to detect fraudulent transactions, e.g. if a user requests a delivery of a purchased item to a country that does not feature in call history logs for a past time period (e.g. last month) then the server device may initiate further security checks, such as re-routing the user to webpages that require confirmation of passwords and/or payment details.

FIG. 3 shows a telecommunications network 100 according to examples of the present disclosure. Telecommunications network 100 comprises at least service provider network 104 and wider network part 106. Telecommunications network 100 may additionally comprise further network parts (not shown), and or border/gateway/caching entities (not shown) for translating between the various network protocols used in each network part, caching and serving commonly accessed data so as to reduce load between network parts and/or managing access to each network part. The telecommunications network 100 may comprise features as described with reference to FIGS. 1A and 1B. Service provider network 104 is responsible for providing telecommunications services to a plurality of subscriber client devices, including at least subscriber client device 102. A subscriber client device may be configured to communicate voice and data. Examples of subscriber client devices may include personal computers, laptop computers, mobile telephones (including "smart phones"), tablet computers, personal digital assistants, etc.

Service provider network 104 includes intermediate network device 110. Intermediate network device 110 is configured to process network requests, such as browser session traffic. In certain cases, network requests may not be browser based, e.g. may relate to, amongst others: voice and/or data requests that are processed by the service provider network; location requests to a positioning system; and/or network requests transmitted by one or more applications or operating systems on the subscriber client device 102. In certain cases, a network request may relate to a portion of a requested web-page, e.g. may be a request for content (e.g. advertising data) from an entity that differs from an entity that is supplying the web-page. In certain cases, the network request may comprise a request to a programmatic or real-time bidding advertisement system. In certain cases, this processing may be performed according to one or more browser session processing modification rules as described with reference to FIGS. 1A and 1B.

According to examples, service provider network 104 comprises a carrier network operated by a carrier. A carrier network may provide wired and/or wireless network access. According to examples, service provider network 104 comprises a mobile network (which may be in the form of a cellular network) operated by a mobile network operator (MNO). A mobile network operator provides wireless network access, e.g. by way of a radio access network and a core network as described previously. According to examples, service provider network 104 comprises an internet service provider network operated by an internet service provider (ISP). An ISP may provide wired network access, e.g. via dial-up, (asymmetric) digital subscriber lines, cable modems, integrated services digital networks and/or fibre-optic lines. A carrier network may comprise a mobile network and/or an ISP. Wider network part 106 is responsible for routing traffic (e.g. packetized data traffic encoded according to the Hypertext Transfer Protocol (HTTP)) to and from one or more server entities accessible via wider network part 106, including at least server device 108. In certain cases, the server provider network 104 may alternatively or additionally provide telecommunications services in the form of wireless network (e.g. "wi-fi") access to at least one subscriber client device 102; this may instead of, or in addition to, mobile access (e.g. by an MNO) and/or ISP functions.

In examples, the intermediate network device 110 receives network requests from a client device, i.e. a client device operated by a subscriber, wherein the subscriber and/or the client device are authenticated and are authorised to use the service provider network. For example, the intermediate network device 110 may comprise an additional server, or adapted functionality of an existing server, coupled to or within a core network, wherein packet-based network traffic is routed through the intermediate network device 110. In one case, intermediate network device 110 may comprise a plurality of servers in parallel, where a load balancing entity may be configured to receive network requests from client subscriber devices and distribute these network requests amongst the plurality of servers, wherein each server is configured to modify network requests as described herein. A network request, in one implementation, may comprise an HTTP request, wherein a browser session may comprise an HTTP session. The HTTP request may comprise a GET or POST method call. In other implementations, the network request may comprise packets of data sent by another application layer protocol or by another protocol in a network communication stack.

Routing via an intermediate network device 110 as described herein may be implemented using policy-based routing based on an IP address of a network request. The network request may comprise an HTTP request for a webpage and/or a portion of a webpage, such as a frame or other content. The policy-based routing may be applied to a pre-defined network traffic type (e.g. HTTP only) and be configured to route data via an IP address of the intermediate network device 110 and/or a load balancer associated with a plurality of intermediate network devices. The intermediate network device 110 operates as a transparent proxy within network communications. The intermediate network device 110 may be configured using a management network within the service provider network 104.

In the example of FIG. 3, the intermediate network device 110 is configured to modify a received network request to include a network identifier. In one case, the browser session processing modification rules are configured to modify the network request in this manner. A network identifier comprises any data, for example in the form of a token, that is used to link data originating from the service provider network to a network request. In one case, a network identifier may comprise a series of characters, e.g. from a character encoding scheme such as the American Standard Code for Information Interchange. A network identifier may be of a predefined length, e.g. a defined number of characters. The predefined length may be configurable; for example, it may be defined based on an estimated network request load. If the network request comprises an HTTP request, then modification of the network request may comprise inserting the network identifier into a Uniform Resource Locator (URL) that identifies a resource on the server device 108, e.g. as a parameter value within a query string—"/serverdevice/resource.html?nid=d5VWn9LKoz". Alternatively and/or additionally, the network identifier may be added to an HTTP request as request header field, e.g. as a value for a standard or non-standard request field, such as "X-NID: d5VWn9LKoz". In one case, the network identifier may be inserted into a user agent field, e.g. a modifiable user agent field in an HTTP request. Modification of a network request, i.e. insertion of the network identifier, may occur in real-time, e.g. with less than a 5 ms delay.

In the example of FIG. 3, data originating from the service provider network may comprise any data that is stored within the service provider network, e.g. with one or more network-accessible data storage devices. For example, it may comprise one or more of: personal information associated with the subscriber, such as name, date of birth, home or postal address, email address, international mobile subscriber identity number or numbers, gender, employment details etc.; information associated with subscriber client devices registered with the subscriber, such as make and model, equipment specifications and characteristics (e.g. storage capabilities, screen size, available memory and processor); network usage history such as telephone call logs, short messaging service logs, browser session logs (including URL and search histories for a subscriber) etc.; and geo-location data, such as records of base stations that have been used to access the service provider network and/or global positioning system data transmitted by user equipment as part of service provider network operation. The data originating from the service provider network may comprise one or more of raw data and processed data. For example, in the latter case, the data may comprise a result of one or more processing and/or analytic functions, such as a result of behaviour profiling based on subscriber data. The data originating from the service provider network may further comprise one or more user-generated preferences, such as a declared interest in one or more services offered by server device 108.

As shown in FIG. 3, the telecommunications network 100 further comprises data broker 114. The data broker 114 comprises a server that is accessible from the wider network 106. In FIG. 3, the server device 108 is able to access the data broker 114 via the wider network 106. For example, the data broker 114 may have a public IP address and/or be coupled to one or more public networks forming the wider network 106. The server device 108 may be able to submit network requests to the data broker 114, e.g. using HTTP and a URL assigned to the data broker 114. This contrasts with other data storage devices and/or service devices managing the data originating from within the service provider network 104, which may not be publically accessible, e.g. they may be located behind firewall devices, may not be communicatively coupled to public networks and/or may not have public network addresses. The data broker 114 is also securely coupled to the service provider network 104. For example, the data broker may be located within the service provider network 104 or may be logically coupled via a virtual or backhaul private network but physically located/hosted elsewhere. Following the modification of a network request by the intermediate network device 110, said device 110 is arranged to instruct the configuration of the data broker 114 based on the mapping between the network identifier and the data originating from within the service provider network. Following configuration, the data broker 114 is adapted to transmit at least a portion of the data originating from the service provider network based on the mapping within the predefined time period, i.e. within the period in which the mapping is active. For example, the server device 108 may be arranged to receive a modified network request comprising a network identifier from the subscriber client device 102, the network request being received via the wider network 106 and the service provider network 104. The service device 108 may then be configured, on receipt of a network request comprising a network identifier, submit a further network request to the data broker 114. This may be a Representational State Transfer (REST) request using HTTP methods. The further network request may contain the received network identifier. On receipt of the further network request, the data broker 114 is then arranged to use the configuration and the received network identifier to retrieve data originating from the service provider network 104. For example, the configuration may comprise a look-up table containing the data originating from the service provider network 104 that is indexed by the network identifier. Alternatively, the configuration may comprise a look-up table that maps the network identifier to a subscriber identifier, the subscriber identifier then being useable to query data sources within the service provider network 104. In certain cases, the data broker 114 may also be provided with details of the network request, e.g. as part of a mapping entry. In certain cases, as described in more detail below, the data originating from the service provider network may be formatted according to a registered profile of server device 108. As such, requests to data broker 114 having the same network identifier but originating from two different server devices may result in a different responses.

The use of the data broker 114 and a time-limited rotating network identifier enables limited information to be securely communicated to the server device 108 without making data sources within the service provider network 104 open to attack or malicious access on the wider network 106. Moreover, the data broker 114 may be configured to modify data originating within the service provider network 104 before sending that data to the server device 108. For example, the data broker 114 may be configured to anonymise the data and/or cryptographically secure the data before transmission to the server device 108. Additionally, access by the server device 108 may be controlled, e.g. if the server device 108 is detected as acting in an abnormal manner then the data broker 114 may be configured to not respond to the server device 108 even if a valid network identifier is present in network requests. As the configuration of the data broker 114 is time-limited, for example a mapping may be deleted from a cache or memory of the data broker 114 after the predefined time period associated with the mapping has expired, server device 108 is unable to access data originating from within the service provider network 104 outside of the context of a network request by the subscriber client device 102. For example, the predefined time period may comprise 100 ms, 5 minutes or 1 hour, and may be configured to be a suitable time to perform a transaction with the server device 108. As such, data originating from the service provider network may be used to complete the transaction, but the server device 108 cannot access this data outside of the context of the transaction. For example, a location of a subscriber client device 102 may be sent to the server device 108 in the manner described above within the predefined time period, in order to configure fraud detection for an online payment; however, the server device 108 is unable to continue to track the location of the subscriber client device 102 outside of the predefined period. If the server device 108 was able to track the location of the subscriber client device 102 outside of the predefined period this may present a cyber-security risk.

By modifying one or more network requests at intermediate network device 110 in service provider network 104, examples may be in contrast to known modification techniques wherein modification is performed by one or more of: a browser on a subscriber client device (according to code running locally on the browser), a server (during construction of a browser session response), a border entity responsible for managing access to a given network part, a gateway entity responsible for translating between network protocols used in different network parts, a caching entity responsible for caching and serving data commonly requested between network parts, a network device outside of the carrier entity, or an encoding entity responsible for modifying browser session traffic for efficient routing. Thus, in certain examples, the modification is not performed by a browser on a subscriber client device, by a server during construction of a browser session response, a border entity responsible for managing access to a given network part, a gateway entity responsible for translating between network protocols used in different network parts, a caching entity responsible for caching and serving data commonly requested between network parts, a network device outside of the carrier entity, and/or an encoding entity responsible for modifying browser session traffic for efficient routing.

According to examples, service provider network 104 comprises a routing fabric, responsible for routing traffic between subscriber client device 102 and wider network part 106. The service provider network 104 may include a routing system that selects the route for calls or data. According to examples, intermediate network device 110 is located in the routing fabric of service provider network 104. Conventionally, the routing fabric of the service provider network is reserved for routing only, and not the modification of network requests. However, examples adapt the routing fabric through the introduction of intermediate network device 110.

Figure 4:
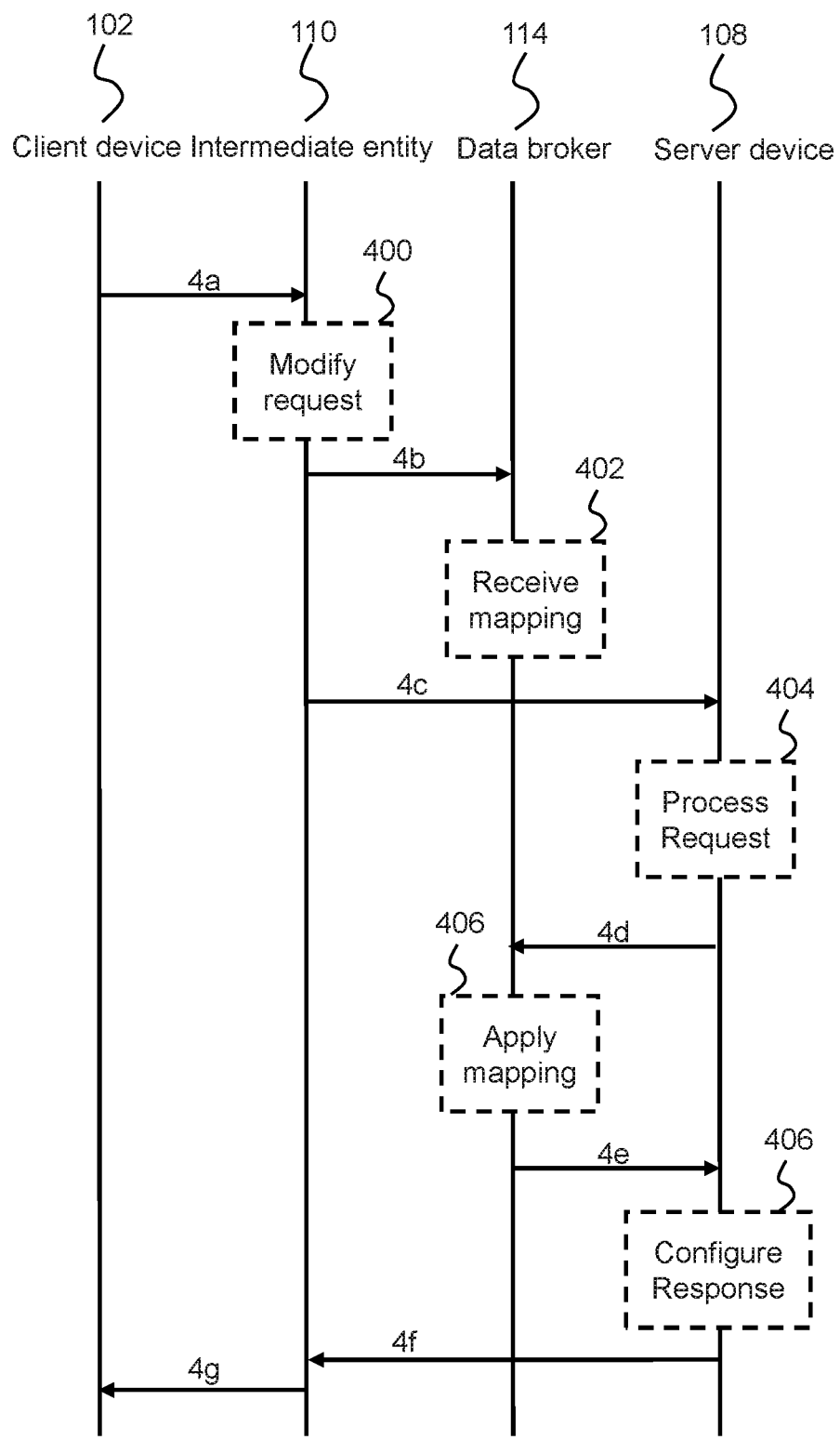
FIG. 4 is a sequence diagram showing a method of modifying a network request according to the examples.

FIG. 4 illustrates the operation of intermediate network device 110 and data broker 114 in the context of a network session taking place between subscriber client device 102 and server device 108. At action 4a, a network request is transmitted from subscriber client device 102 into telecommunications network 100. This network request may form part of a browser session, i.e. a session performed by a browser or other client application upon the client device 102. The network request of step 4a could comprise a request for a web page, web page element, data file, service, etc. As service provider network 104 is configured to route network traffic via intermediate network device 110, the network request is then received at intermediate network device 110 in the service provider network.

Having received the network request in step 4a, intermediate network device 110 then processes the received network request according to the one or more network session processing modification rules. As a result of the processing, intermediate network device 100 may modify the received network request at step 400. Having processed the network request, the processed network request is then transmitted, in step 4c, to server device 108.

Modifying request 400 includes modifying the network request to include a network identifier. The network identifier is selected from a set of available network identifiers. For example, this may be the set of all n-length character sequences that are not currently in use, e.g. are not currently assigned to other network requests. The characters in this case may be selected from a predefined subset of allowed characters (e.g. alphanumeric characters or alphanumeric characters plus a limited set of special characters). This selection may be performed by the intermediate network device 110. In one case, the intermediate network device 110 may generate a random character sequence and then perform a look-up on a mapping table. If the generated character sequence is not present in the mapping table it is deemed available for use. If the generated character sequence is present in the mapping table, then a further random character sequence may be generated and a further check performed. This process may be repeated until a random character sequence is generated that is not present in the mapping table. The network identifier may be deemed for use with the received network request, e.g. it may be assigned to the received network request for a predefined time period and be used to provision data that is associated with the network request. This association may be based on a particular subscriber and/or subscriber client device that is generating the network request.

In embodiments, the network identifier comprises a universally unique identifier (UUID). In some embodiments, the network identifier is generated based on high-quality randomness, for example using Linux/Unix's '/dev/urandom' data generation. In some embodiments, the network identifier is generated on the basis of one or more of the current time, a local Ethernet media access control (MAC) address and data generated using a pseudo-random generator.

In some embodiments, when using high-quality randomization there is no seed (such as time and MAC address) that can be isolated. A sample of a log containing the network identifier is as follows:

[Thu Aug 20 19:27:20.338477 2015] [hee:trace2] [pid 2445:tid 140063197697792] mod_hee.c(3918): AH03067: sp_id=dbbd46fb-aabe-4be4-bad0-0ce6a428fbb0;

The components in the above sample log can be explained as follows:
[Thu Aug 20 19:27:20.338477 2015]=log entry time;
[hee:trace2]=log verbosity level, this part mentions the source of the entry (in this case from the intermediate entity itself (HEE));
[pid 2445:tid 140063197697792]=process id (pid) and thread id (tid);
mod_hee.c(3918):=source file and line number where the log entry has been triggered from;
AH03067=the error (debug) code;
sp_id=dbbd46fb-aabe-4be4-bad0-0ce6a428fbb0=the actual network identifier associated to the key named "sp_id".

Following the selection of the network identifier, modifying the network request 400 may further comprise generating, for the received network request, a mapping between the selected network identifier and data originating from the service provider network.

In one case, the mapping may comprise a mapping between the network identifier and one or more data indexes, such as unique identifiers that are used as keys in data records forming the data originating from the service provider network. For example, a data storage device accessible from within the service provider network (but not accessible from one or more public networks) may store a subscriber profile data comprising one or more of information associated with the subscriber and information associated with one or more subscriber client devices. In this case, the mapping may comprise a mapping between the network identifier and one or more of a subscriber identifier (e.g. an international mobile subscriber identity number) and a user equipment identifier (e.g. an international mobile station equipment identity). For example, the mapping may comprise a row in a look-up table or the equivalent pairing in an associative array. In this case, the one or more data indexes may then be used to identify a data record in the data originating from the service provider network, e.g. in one or more databases within said network, wherein data fields may be extracted from the data record for later supply as discussed below. As such, the mapping in this case may be considered an indirect mapping.

In another case, the mapping may comprise a direct mapping between the network identifier and data originating within the service provider network. For example, the intermediate network device 110 may be configured to look-up particular data items for subsequent supply to server devices and these may be associated with the network identifier. In a simplified example, the following data items may be available for provision from a data broker: 1) a location of the subscriber client device 102 making the network request; 2) a make and model of the subscriber client device 102 making the network request; and 3) an email address of the subscriber associated with the subscriber client device 102.

In this case, the intermediate network device 110 may be configured to retrieve these data items from one or more private databases within the service provider network, e.g. based on control data that accompanies the network request that is only available from within the service provider network. The mapping may then comprise a row of entries in a table or equivalent associative entries, said entries comprising the network identifier as an index and each of the retrieved data items 1), 2) and 3).

As an example mapping, say for example a record for a subscriber Jay Doe is as follows:
SubscriberID—346873132679
Gender—Male
DOB—21 Mar. 1977
Home Location—12 Deer St, London EC1 3D4

In this example, a data partner x provides a campaign BluFall15 targeting males between 30 and 39 years old living in London EC1 coded as M3039EC1. As a result, it is detected that Jay Doe fits BluFall15 campaign segment criteria and the following record is stored:346873132679, M3039EC1.

Jay Doe then uses his mobile phone, which in turn triggers a request to data partner x; the data partner x request is then enriched with a single identifier dbbd46fb-aabe-4be4-bad0-0ce6a428fbb0, and the following record is transmitted:
dbbd46fb-aabe-4be4-bad0-0ce6a428fbb0, M3039EC1.

When data partner x requests data related to dbbd46fb-aabe-4be4-bad0-0ce6a428fbb0, a response with M3039EC1 is made.

In the present example, the mapping is configured to persist for a predefined time period following receipt of the network request. In one case, the mapping may be stored in a cache or random access memory for a configurable time period, such as 500 ms or 5 minutes. On expiry of the configurable time period the mapping may be deleted or otherwise removed from a data storage device. The selected network identifier is returned to the set of available network identifiers on expiry of the predefined time period. For example, if a check is used to see whether a generated network identifier is present in a mapping table, then deletion of a row of that table containing the selected network identifier has the effect of returning the selected network identifier to the pool of available network identifiers.

Once, a network identifier has been selected for the network request and a corresponding mapping has been generated, intermediate network device 110 may further configure the data broker 114 based on the mapping in step 4b. In FIG. 4, an entry in a mapping table or associative array may be securely transmitted from the intermediate network device 110 to the data broker 114, such that the data broker 114 receives the mapping 402. The mapping may be transmitted using a private communication path within the service provider network. The mapping may be encrypted. Hence, at block 402, the data broker 114 receives at least a mapping between a first network identifier and data originating within the service provider network, wherein the mapping is associated with a particular network request made by the client device 102. In one case, the data broker 114 is configured to store, in data storage communicatively coupled to the data broker 114, the mapping for a predefined time period. The data broker 114 may be configured to decrypt any encrypted data. The data storage may comprise a cache, random access memory or a persistent storage device such as a magnetic hard disk or solid state storage device. The intermediate network device 110 may transmit to the data broker 114 a value for the predefined time period. Alternatively, the data broker 114 may compute the predefined time period from receipt of the mapping at block 402 or a time of storage. In this case, the data broker 114 may be configured to automatically delete the mapping, e.g. a row of a look-up table or other equivalent data, from data storage on expiry of the predefined time period. In any case, the mapping is only active for a limited time period following initial receipt of the network request at block 400.

Returning to FIG. 4, upon receipt of the network request transmitted in step 4c, server device 108 processes the network request at block 404 in order to generate a corresponding browser session response. In this example, the server device 108 is configured to parse the received network request for the presence of a network identifier. This may comprise determining whether a particular query parameter or header field is present in an HTTP request. If no network identifier is present in the network request the server device 108 is configured to generate and transmit a corresponding browser session response in a conventional manner. If a network identifier is present in the network request, the server device 108 in the present example is configured to perform the operations described below. Hence, if a network identifier is present in the network request, the server device 108 may be arranged to send a different network response as compared to a case where a network identifier is not present in the network request.

Following identification of a network identifier in a received network request, the server device 108 is first configured to extract the network identifier from the network request. This may comprise extracting data from a particular HTTP query parameter and/or header field. Having a network identifier, in the example of FIG. 4, the server device 108 is then configured to send a data request 4d to the data broker 114, wherein the data request contains the extracted network identifier. The data request 4d may comprise an HTTP request, e.g. according to a RESTful specification. The data request 4d may be encrypted and/or may comprise a token that authenticates the server device 108. In certain cases, the server device 108 may perform an authentication procedure to be authenticated by the data broker 114. The data request 4d may comprise an indication of the data that is requested by the server device 108. In certain cases, the server device 108 may register for particular data with the data broker 114. If the server device 108 only requires a single data item, e.g. such as an indication that the subscriber of the subscriber client device 102 is authorised to access a particular service, then an indication of the data may be omitted.

At block 406, the data broker 114 receives the data request 4d from the server device 108 that is located outside of the service provider network. The data broker 114 is configured to extract a network identifier from the data request 4d, the network identifier being that added by the intermediate network device 110 at block 400 and received with the network request following action 4c. At block 406, the data broker 114 uses the network identifier extracted from the data request 4d to determine if a mapping exists that contains that identifier. In the example of FIG. 4, if the data request 4d is received within the aforementioned predefined time period, a mapping will exist comprising the network identifier, namely the mapping received at block 402. At such, block 406 may be thought of as determining a match between a second network identifier present in the data request 4d and a first network identifier contained within a mapping stored by the data broker 114. In this case, responsive to the second network identifier being equal to the first network identifier and a current time being within the predefined time period, the data originating within the service provider network may be retrieved based on the mapping. For example, this may comprise extracting a data item from a row of a mapping table or an equivalent associative array, wherein the array or row entry is indexed by the matching network identifier.

In a case where the mapping comprises a mapping between a network identifier and one or more data indexes, the data indexes may be used by the data broker 114 to retrieve an appropriate data item to respond to the data request 4d. For example, if one data index comprises a subscriber identifier for the subscriber operating client device 102, and the indication of data requested by the server device 108 comprises one or more postal address fields, then the data broker 114 may extract a subscriber identifier from the mapping and use this in a query operation on a subscriber profile database to retrieve the one or more postal address fields. In a case where the mapping comprises one or more data items associated with the data request and/or indication of data from the server device 108, then these data items may be retrieved directly from the mapping.

Via data response 4e, the data broker 114 transmits at least a portion of the data originating within the service provider network, i.e. the data items retrieved at block 406, to the server device 108. If the data request 4d is received outside of the predefined time period, such that a mapping may no longer be accessible to the data broker 114, the data broker 114 may indicate an error or decline the data request in the data response 4e.

If the data request 4d is successful and the data response 4e comprises the data items requested by the server device 108, then the server device 108 configures the response to the original browser session request 4c at block 408. The server device 108 may be configured to dynamically generate HTML content based on the data items. For example, the server device 108 may be configured to pre-populate HTML form fields with the data items, log-in to a particular service and provide a post-log-in webpage, or perform conditional transaction processing such as fraud checks.

At step 4f, server device 108 transmits the generated network response, which may comprise a browser session response, into telecommunications network 100, directed at subscriber client device 102. In the example of FIG. 4, the response is also routed through intermediate network device 110, which forwards the response 4g to the client device 102. In other examples, the response need not be routed via intermediate network device 110 but may use a different routing path (e.g. default or normal path) within the service provider network 104.

In one variation, data request 4d may be omitted. In this case, the data broker 114 may be configured to determine a data provision endpoint associated with the server device 108, e.g. a network endpoint or location to receive a response such as a Uniform Resource Identifier (URI). The data broker 114 may then be configured to apply the mapping at block 406 and transmit data originating from the service provider network to the data provision endpoint at action 4e. For example, the data broker 114 may be configured to wait for a predefined time period following receipt of the mapping at block 402 and following expiry of this predefined time period transmit data items to the data provision endpoint. This variation thus reflects a "push" configuration in contrast to the "pull" configuration based on a server data request shown in FIG. 4.

Figure 5:
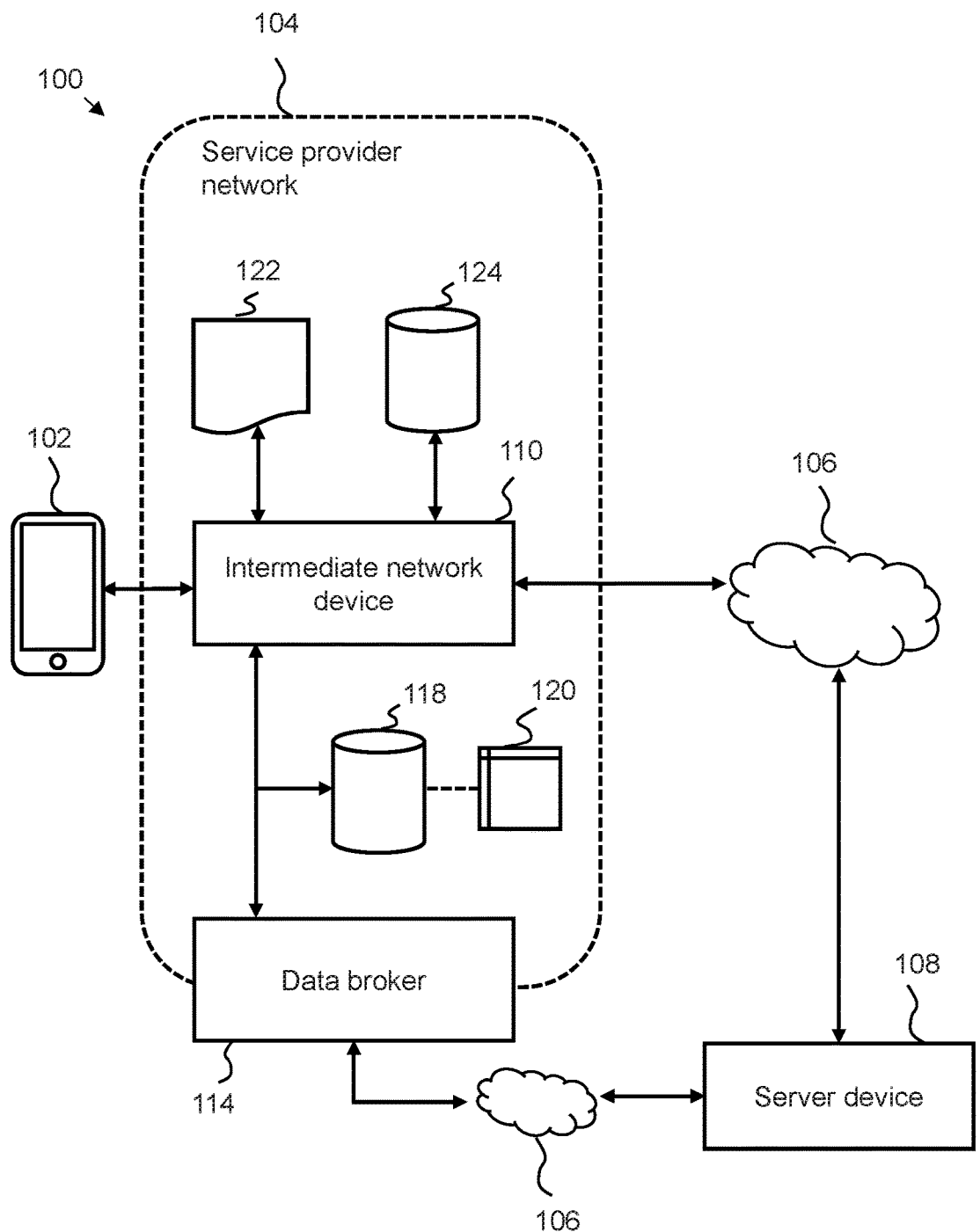
FIG. 5 is a system diagram showing components of a telecommunications system according to examples.

FIG. 5 shows telecommunications network 100 according to an example. The functionality of subscriber client device 102, service provider network 104, and wider network part 106, server device 108, and intermediate network device 110 are the same as described above in relation to FIG. 3. However, in the examples shown in FIG. 5, service provider network further comprises data storage device 118, lookup table 120, network data 122 and service provider database 124.

According to some examples, action 4b and block 402 include transmitting, over a secure communication channel, configuration data between the intermediate network device 110 and the data broker 114. In one case, this configuration data may comprise a mapping between a given network identifier and data originating from the service provider network 104.

The example of FIG. 5 depicts a telecommunications system 100 including a data storage device 118. In one case, the mapping and at least a portion of the data originating from the service provider network are stored in the data storage device 118 that is accessible to the data broker 114. This storage may be performed by one or the intermediate network device 110 and the data broker 114. The data stored in the data storage device 118 may then be used by the data broker 114 to respond to a request from a server device 108. In one case, the mapping and the portion of the data originating from the service provider network are removed from the data storage device following expiry of the predefined time period.

According to some examples, step 4b further includes anonymising the portion of the data originating from the service provider network before transmission to the data broker. Anonymization may comprise processing the data originating from the service provider network such that a given data value may apply to at least a (predefined) plurality of subscribers in a subscriber profiled database. For example, a data value indicating gender of a subscriber may be considered an anonymised value as a large number of other subscribers will also share the same gender value. However, address data may not be considered anonymised. Therefore, an anonymization process may comprise selecting the first m postal code values of an address, e.g. identifying an anonymised region that may comprise many subscribers. If the data originating from the service provider network is to comprise several different data items associated with a given subscriber, then anonymization may comprise processing one or more of the data items such that the combined set of data items apply, at most, to X % of subscribers. For example, value ranges may be configured to anonymise data items, e.g. a date of birth may be shared by less than 1% of subscribers but an age range may be configured such that it is shared by at least 15% of subscribers, where "15%" is deemed to anonymise subscribers. In this case, the start and end of the range may be provided as data items by the data broker. In one case, anonymization may comprise replacing a subscriber or subscriber client device identifiers with data values, e.g. demographic information and/or device parameters that are not useable to determine the identity of the subscriber and/or the subscriber client device. Anonymised data items may be stored in a look-up table together with the network identifier. In other cases, anonymization may be performed by the data broker 114 before transmission to the server device 108. In both cases, anonymization may be performed before data is transmitted over public networks.

According to some examples, in modify request 400, the mapping comprises an entry in the look-up table 120 as shown in FIG. 5. In one case, the look-up table 120 associates the network identifier with a subscriber identifier, the subscriber identifier being used as an index in the data originating from the service provider network, and wherein modify request 400 further includes removing the entry in the look-up table following expiry of the predefined time period. In one case, the look-up table 120 may comprise the network identifier and one or more anonymised data items for communication to a server device 108 by the data broker 114.

According to some examples, modify request 400 includes determining a subscriber identifier from the received network request, including using network data 122 that is accessible within the service provider network, said network data 122 not being accessible from outside of the service provider network. The network data 122 may comprise user plane and/or control plane data. For example, one or more of an international mobile subscriber identity and an international mobile equipment identity may be used as a subscriber identifier to determine a subscriber identity. This data is not transmitted outside of the service provider network 104. The subscriber identifier may then be used by the intermediate network device to retrieve data associated with a subscriber from at least one database accessible within the service provider network, i.e. service provider database 124 in FIG. 5. This database is not accessible from outside of the service provider network. According to some examples, the service provider database 124 comprises data aggregated from a plurality of separate data sources. These data sources may comprise geo-location databases and/or databases of search history. In certain cases, a separate database or cache of data may be stored in addition to data sources used within the service provider network 104 for day-to-day operation of the service provider network 104. This may be used to consolidate and/or aggregate many different data sources and increase query response times. The intermediate network device 110 and/or the data broker 114 may be configured to query this database or cache for data originating within the service provider network 104. In certain cases, the database or cache may be updated on a push basis, e.g. in response to push notifications from control systems of the service provider network 104. For example, a notification to update this database or cache may be received every time a subscriber client device 102 changes location and/or periodically (e.g. every X minutes) so as to keep location information up-to-date.

According to some examples, modify request 400 further includes modifying the network request by retrieving a consent variable for the subscriber from the service provider database 124. This consent variable may indicate whether the subscriber has provided consent for modification of network requests. The consent variable may comprise a set of consent values, wherein each value is associated with a particular server device 108. A subscriber may provide authorisation for a particular server device to access data associated with the subscriber within the service provider network 104. For example, this authorisation may be performed by accessing an account webpage for the subscriber and toggling a value of a check-box associated with a given server device 108 and/or an operating entity for the server device 108. In these cases, the network request may only be modified if the consent variable indicates that consent has been provided. For example, if the subscriber has provided consent for modification of network requests for all server devices then a positive value for the consent variable (indicating "Yes") may be retrieved from service provider database 124 and the network request may be modified. Alternatively, if the subscriber has not authorised server device 108 to receive data associated with the subscriber, where the server device 108 is identified by a URL within the network request, then a negative value (e.g. "No") for a consent variable associated with the server device 108 may be retrieved and modification may not take place.

According to some examples, the network request comprises an application protocol request, such as an HTTP request, and the network identifier comprises a random fixed-length string that is inserted into the application protocol request.

According to some examples, receive mapping 402 further includes receiving, at the data storage device 118, a data structure comprising an inserted network identifier and the data originating within the service provider network, the data structure having the inserted network identifier as an index. The data structure may be prepared and sent by the intermediate network device 110 and stored in the look-up table 120. Applying mapping 406 may then further include, at the data broker 114, using a second network identifier, which is extracted from a server device request, to perform a look-up operation on the data structure, wherein, responsive to the second network identifier being equal to the stored network identifier, the data originating within the service provider network is returned by the look-up operation, and wherein, responsive to the second network identifier not being equal to the first network identifier, the data originating within the service provider network is not returned by the look-up operation. In the first case, the data originating within the service provider network may be transmitted in a response to the server device 108. In the second case, an error message may be transmitted in a response to the server device 108. The error message may also be transmitted to the server device 108, in a current time (i.e. a time the data broker 114 received a request from the server device 108) is outside of the predefined time period (i.e. a time period that is defined to set the time that the data within data storage device 118 persists).

According to some examples, step 4d includes authenticating the server device 108. For example, the server device 108 may supply an authentication token and/or provide log-in credentials. In certain cases, data broker 114 may store configuration data associated with a set of server devices 108 that are configured to use the data broker 114. In one case, prior to the operations shown in FIG. 4, the server device 108 is registered with the data broker 114. This may comprise configuring authentication details and/or storing an indication of one or more data items that are requestable by the server device 108. In this case, the server device 108 is one of a plurality of server devices that are registered with the data broker 114. Configuration data may be stored by data broker 114 in data storage device 118. The configuration data may further comprise a data format for provision of the data to service device 108. In this case, block 406 may comprise retrieving a registered data format associated with the server device 108 and formatting one or more data items according to the registered data format. A registered data format may indicate, amongst others, one or more of: data exchange language to be used (e.g. extended Markup Language—XML—or JavaScript Object Notation—JSON); one or more key or field names for the provisioned data; a level of precision for the provisioned data; and a configuration of one or more data structures comprising the provisioned data (e.g. a level in a node hierarchy).

In one case, the data broker 114 may comprise a defined application programming interface (API), wherein the specification of the API is published to server devices on the wider network. In this case, the data request 4d may comprise an API call or request. In certain cases, configuration data may be provided by the server device 108 within the data request 4d according to the API specification.

The intermediate network device 110 may be implemented on one or more server devices, e.g. such as a multi-core server blade comprising at least one processor and at least one memory.

Figure 6:
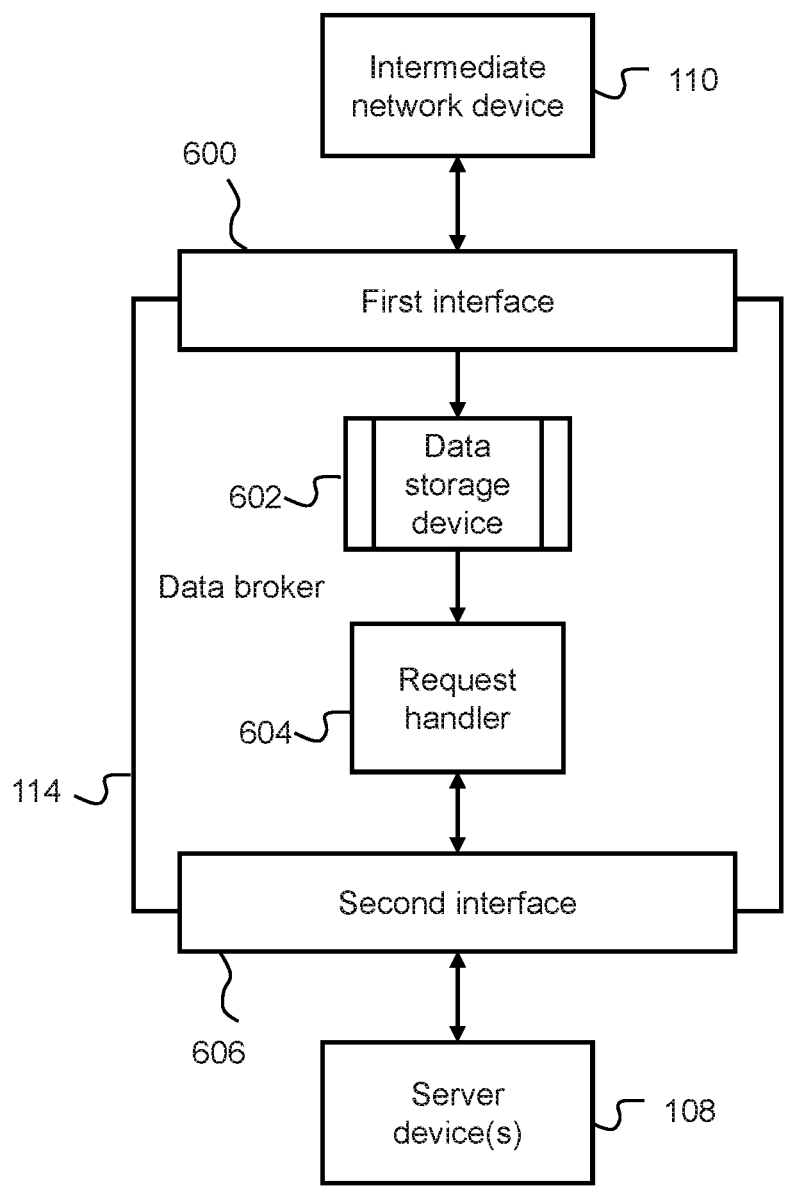
FIG. 6 is a system diagram showing components of a data broker according to examples.

FIG. 6 depicts an implementation of data broker 114 according to an example. The functionality of data broker 114 may the same as described above in relation to FIG. 3. In the example shown in FIG. 6, data broker 114 further comprises first interface 600, data storage device 602, request handler 604, and second interface 606. Each interface may comprise one or more of hardware and machine code interfaces, e.g. a combination of physical network interfaces arranged to receive data over a network and kernel components to process and handle received data. The first interface 600 is configured to receive data from a service provider network that associates network requests to data originating within the service provider network. In the example of FIG. 6, the first interface 600 is communicatively coupled to the intermediate network device 110. In other examples, the first interface 600 may be communicatively coupled to other devices within the service provider network. Within the configuration of data broker 114, the first interface 600 is communicatively coupled to the data storage device 602. The data storage device 602 may comprise, amongst others, a random access memory or a solid state storage device. The data storage device 602 is configured to cache data received at the first interface 600. As described above, the received data may comprise a network identifier and one or more of a subscriber identifier and data items from data sources that are available within the service provider network. The second interface 606 is communicatively coupled to one or more server devices 108 that are located outside of the service provider network. For example, the second interface 606 may be a public interface, e.g. may be coupled to one or more public networks including the Internet. The second interface 606 receives data requests from the one or more server devices 108 located outside of the service provider network, e.g. requests such as data request 4d in FIG. 4. Within the configuration of data broker 114, the second interface 606 is communicatively coupled to the request handler 604. The request handler 604 in this example is configured to parse data requests received at the second interface 606 to extract, for each data request, at least a network identifier. For example, the second interface 606 may be implemented at least in part by a web server that is configured to pass data from HTTP requests to the request handler 604.

In the example of FIG. 6, each item of data received at the first interface 600 indicates a relationship between a network identifier assigned to a given network request and data originating within the service provider network. The network identifier may comprise a network identifier inserted into a network request by the intermediate network device 110, e.g. as per block 400 of FIG. 4. The data originating within the service provider network may be associated with a given subscriber that is registered with a client device that transmitted the given network request. In use, the data broker 114 is configured to persist each item of said data for a predefined time period in the data storage device 602. In one case, received data from the intermediate network device 110 may indicate the predefined time period; in another case, the predefined time period may be determined from one of time of receipt at the first interface 600 and/or time of storage in the data storage device 602. Other computations for the predefined time period may also be used such that the data stored in the data storage device is inaccessible following a set time, which may be, for example, in the range of milliseconds or minutes. If network responses are routed via intermediate network device 110, then, in one case, receipt of a network response sent in reply to a modified network request may trigger a communication to data broker 114 to indicate that the mapping may be deleted.

The request handler 604 is configured to use, for each data request received at second interface 606, the extracted network identifier in association with cached data stored in the data storage device 602 to determine whether data originating within the service provider network is available that relates to the extracted network identifier. Responsive to data originating within the service provider network being available, the request handler 604 is configured to respond to a data request received at the second interface 606 with said data originating within the service provider network. In one case, this data may be retrieved directly from the data storage device 602, in another case the data may be retrieved via a query on one or more private data sources, e.g. sources within the service provider network, the query using one or more data indexes retrieved from the data storage device 602.

In one variation, instead of (or as well as) the request handler 604, the data broker 114 may comprise a data provision component to transmit data originating from within the service provider network to one or more server devices 108. For example, the intermediate network device 110 may be arranged to determine a data provision end-point based on a URL in a received network request. In one case, a URL of "http://www.server.com/webpage.html" may be mapped to a data provision endpoint of "http://www.server.com/endpoint". The data provision endpoint may be present on the server device that is the recipient of the network request or be present on a server device communicatively coupled to the server device that is the recipient of the network request. In this case, the data provision component may transmit the network identifier together with the data originating from within the service provider network to the data provision endpoint. This enables the server device that is the recipient of the network request (e.g. server device 108 in FIG. 4) to correlate the data originating within the service provider network with the originally received network request (e.g. intercepted request 4a/4c as shown in FIG. 4), e.g. in the configure response block 406 of FIG. 4. Data items that are to be supplied to the data provision endpoint may comprise one or more data items that are indicated in configuration data from the server device, e.g. as set during a registration procedure. Operators of server devices may set this configuration data, following appropriate authentication, using a publically accessible control panel webpage. For example, if a server device 108 requests, during a registration procedure, that it is to be supplied with geo-location data indicating a most recent location of the client device 102 then the data broker 114 may receive a mapping of a network identifier and geo-location data following interception of a network request by the intermediate network device 110. Following a configurable delay (e.g. 5 ms), the data broker 114 may then transmit the mapping in a suitable format to the data provision endpoint. In this case, the server device 108 may then apply the mapping to locate the received network request from a group of other received network request (e.g. as stored in memory) and use the data items to configure a response to the request. This illustrates a "push" embodiment.

In certain cases, the first and/or second interfaces 600, 606 may implement an application programming interface. In one variation, the second interface 606 may be configured to additionally respond, e.g. conditional on consent, with subscriber online activity details, e.g. data relating to a plurality of network requests over a given time period, in response to a request for this information.

The operation of the data broker 114 is such that different server devices, making requests associated with a common inserted network identifier may receive different responses. For example, a webpage that comprises content from multiple domains may be decomposed into multiple requests that contain the same network identifier. This may be the case if the server device 108 decomposes a network request on the wider network side 106. For example, to reduce mobile traffic over service provider network, a server device 108 may receive a network request and then break down that request into a series of sub-requests that are sent from the server device 108 to over server devices over the wider network 106. These sub-requests may not pass through intermediate network device 110. The server device 108 may then collate data returned from each sub-request into one network response that is transmitted to the client device 102. In this case, each sub-request may contain the network identifier received by the server device 108. This may result in multiple requests being received by data broker 114. However, using configuration information on each server device and/or parameters in the data requests themselves, data broker 114 may be configured to respond differently to each server device. For example, one server device may receive in a response an indication of authentication, e.g. to log into a website, whereas another server device may receive in a response an indication of age, e.g. to provide age-appropriate content for within that website.

According to examples, each network request comprises a request based on the Hypertext Transfer Protocol (HTTP) and a different network identifier is associated with each network request. According to examples, the service provider network comprises one or more of: a carrier network; a mobile network; a cellular network; and an internet service provider network.

The network identifier may be considered to be a token that is used to determine appropriate data to supply to a server device. The network identifier does not comprise the data originating within the service provider network, e.g. is not an encrypted version or hash of that data. This means that it cannot be used to track a subscriber. A hash or encrypted version of data would have a set value for a set data item, e.g. an age of "18" would have the same encrypted or hashed value and so could be decoded.

In certain cases, the request handler may be configured to filter the data originating within the service provider network based on a server device associated with a given data request. For example, server device 108 may transmit, as part of a data request, an indication of data items that are required. The server device 108 may also transmit an indication of a data format for the data items. In other cases, as well as or instead of being transmitted with a data request, this information may be stored as part of server device configuration data and retrieved by the data broker 114, e.g. from data storage device 602.

In a similar manner to the intermediate network device 110, the data broker 114 may be implemented on one or more server devices, e.g. such as a multi-core server blade comprising at least one processor and at least one memory. The data broker 114 may be communicatively coupled to a network operations centre of the service provider. Server devices may implement one or more operating systems, e.g. a Linux-based operating system, one or more web servers, and one or more database management systems.

Figure 7:
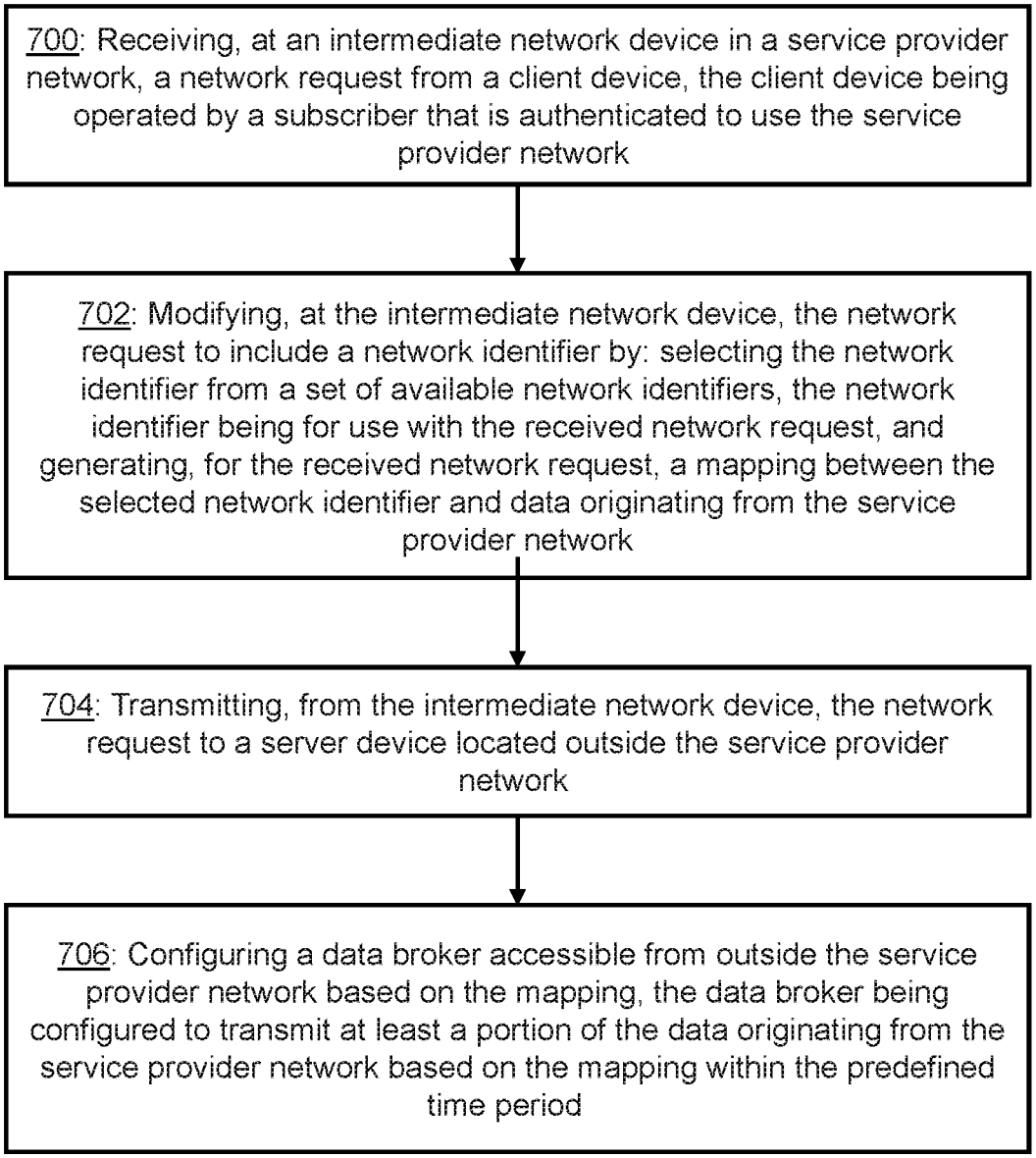
FIG. 7 is a flow diagram showing a method of modifying a network request according to examples.

FIG. 7 is a flow diagram that describes an example operation from the perspective of intermediate network device 110. At step 700, a network request is received from a client device, the client device being operated by a subscriber that is authenticated to use the service provider network. At step 702, the network request is modified to include a network identifier by selecting the network identifier from a set of available network identifiers, the network identifier being for use with the received network request, and generating, for the received network request, a mapping between the selected network identifier and data originating from the service provider network. At step 704, the network request is transmitted to a server device located outside the service provider network. At step 706 a data broker accessible from outside the service provider network is configured based on the mapping, the data broker being configured to transmit at least a portion of the data originating from the service provider network based on the mapping within the predefined time period. The data broker may be configured to transmit at least the portion of the data originating from the service provider network on a "push" or "pull" basis. The data broker may be configured to transmit this data to the same server device that received the modified network request.

In one variation, a plurality of network identifiers may be added to each network request, wherein each network identifier is associated with a particular group of one or more server devices. In this case, multiple mappings may be provided to the data broker.

Figure 8:
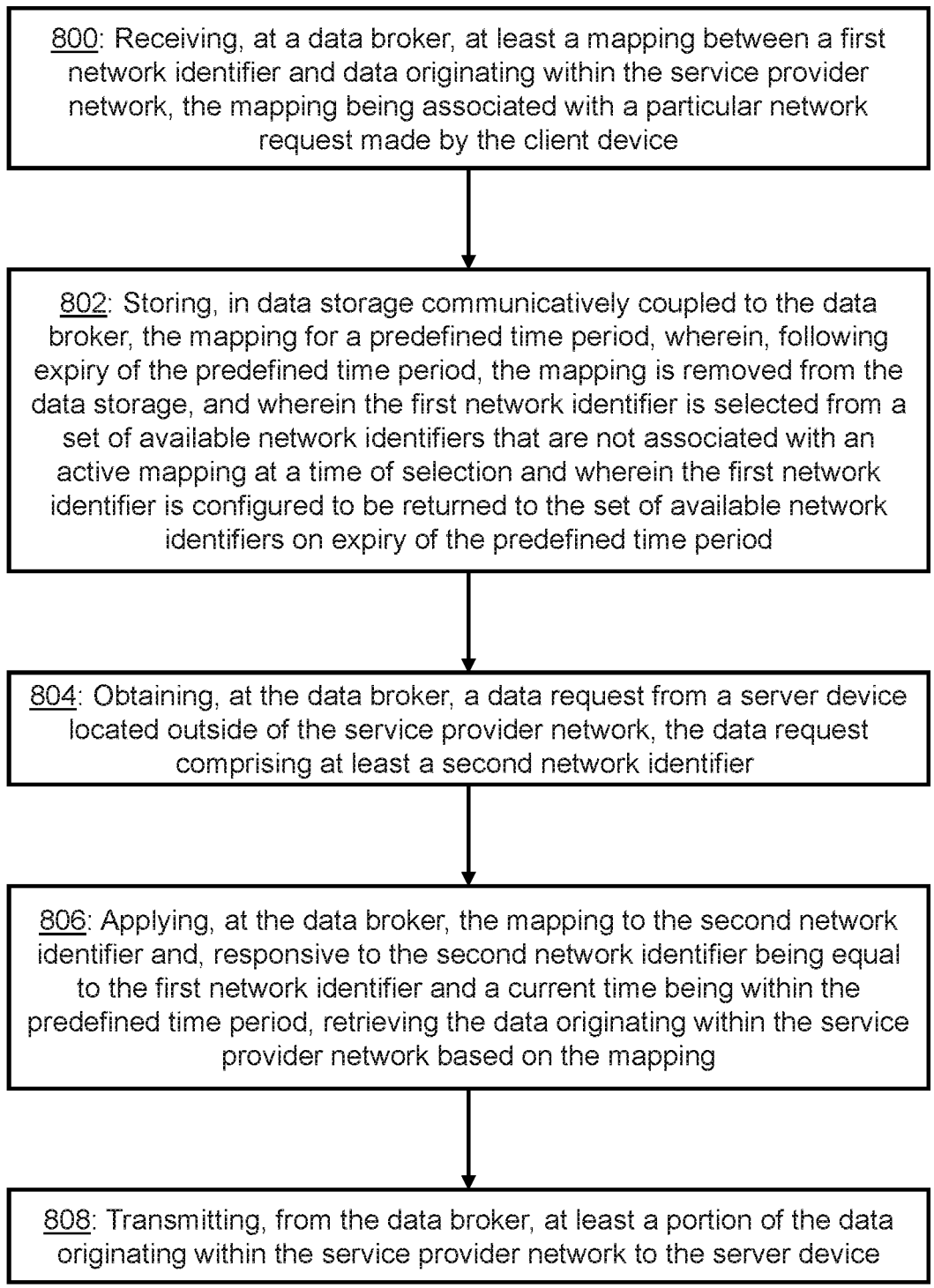
FIG. 8 is a flow chart showing a method of providing according to examples.

FIG. 8 is a flow diagram that describes examples from the perspective of data broker 114. At step 800, at least a mapping between a first network identifier and data originating from the service provider network is received within the service provider network, the mapping being associated with a particular network request made by a subscriber client device. At step 802, in data storage communicatively coupled to the data broker, the mapping for a predefined time period is stored, wherein, following expiry of the predefined time period, the mapping is removed from the data storage. The first network identifier is selected from a set of available network identifiers that are not associated with an active mapping at a time of selection and wherein the first network identifier is configured to be returned to the set of available network identifiers on expiry of the predefined time period. At step 804, a data request from a server device located outside of the service provider network is obtained, the data request comprising at least a second network identifier. At step 806, the mapping to the second network identifier is applied and, responsive to the second network identifier being equal to the first network identifier and a current time being within the predefined time period, retrieving the data originating within the service provider network based on the mapping. At step 808, at least a portion of the data originating within the service provider network is transmitted to the server device.

Examples of configuring a consent variable for a subscriber will now be described. In one case, content supplied to a client device, e.g. in response to a modified network request to a server device, comprises an address of a configuration server. For example, the address may be supplied as an HTTP(S) address of a text and/or graphical link. In one case, a selectable icon may be added on top of the supplied content, e.g. in the corner of a supplied image. On selection, the selectable icon may instruct a network request to the configuration server. The selectable icon may be added by the server device 108 or the intermediate network device 110. The configuration server may form part of the intermediate entity 110 or the data broker 114. The configuration server may reside in the service provider network 104.

In one case, a configuration server resides outside of the service provider network 104 and a network request to the configuration server is routed through the intermediate entity 110. Through interaction with the configuration server, a subscriber of a client device may be able to set the consent variable. In certain cases, the consent variable may comprise an "opt-out" variable, e.g. modifying at the intermediate network device as described herein is performed unless a subscriber indicates that they wish for this not to occur. In other cases, the consent variable may comprise an "opt-in" variable, e.g. modifying at the intermediate network device as described herein is performed if a subscriber indicates that they wish for this to occur.

In one case, a routing fabric of the service provider network 104 may be configured to route network requests to the configuration server via the intermediate entity 110. For example, this may be performed based on URL or IP address matching. In this case, on activation of the address of the configuration server, e.g. by "clicking through" on an anchor HTML element, the routing fabric provides the request to the intermediate entity 110. The routing fabric may include a subscriber identifier in the network request forwarded to the intermediate entity 110. On receipt of such a request, the intermediate entity 110 may be configured to send a request to the data broker 114 (or other entity within the service provider network 104) with the subscriber identifier. The data broker 114 may retrieve the current value of the consent variable from the service provider database 124 and return this to the intermediate entity 110. The intermediate entity 110 may then forward the request onto the configuration server, e.g. if outside of the service provider network 104, with an authorisation token and the current value of the consent variable. The intermediate entity 110 may remove the subscriber identifier. The authorisation token may be used in subsequent communications between the client device 102, configuration server and/or intermediate entity 110.

In one implementation, the configuration server is configured to provide a user interface to allow a subscriber to configure authorisation options, such as setting a value for the consent variable. In this case, a network request to change the consent variable is again routed via the intermediate entity 110. This network request contains a subscriber identifier. The intermediate entity 110 extracts the desired value of the consent variable and the subscriber identifier from the network request to send a variable change request to the data broker 114 (or another entity within service provider network 104). The data broker 114 then updates the value of the consent variable for the identified subscriber. The intermediate entity 104 forwards the desired value of the consent variable to the configuration server, without the subscriber identifier. The configuration server then confirms the change to the client device 102.

These examples of setting the consent variable enable consent or permission to be set without a subscriber identifier, or subscriber-identifying data, leaving the service provider network 104, even though an external configuration server may be used. The process for setting the consent variable may occur in parallel with, or at least be initiated by, the supply of content. The authorisation token may, in certain cases, comprise the aforementioned network identifier. A network identifier may be supplied to the configuration server to enable a response configured for a particular service provider network 104. A request to the configuration server may be routed to the intermediate entity 110 based on a whitelist, e.g. the address of the configuration server may be indicated on the whitelist.

Certain examples described herein enable data originating within a service provider network to be provided in addition to a particular network request. This overcomes certain limitations of standard network requests, such as application protocol requests. Certain examples described herein provide network identification as a service, wherein a network request for transmission over a public network such as the Internet is "identified" as being associated with particular data within a service provider network, e.g. data associated with one or more of a subscriber or a subscriber client device. A server device that is not located within the service provider network, e.g. which has no access to control and service management data within the service provider network, is able to access this data in a real-time or near real-time manner such that a response to a network request may be configured based on this data. For example, a particular webpage may be configured based on this data and returned to a subscriber client device in response to the network request.

The above examples are to be understood as illustrative examples of the invention. Further examples of the invention are envisaged. For example, whilst the above examples have been described in relation to packetized data traffic such as HTTP data, it is to be understood that the methods and systems disclosed herein are also applicable to any similar or equivalent protocol, in particular any request/response based protocol. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of modifying a network request comprising:
receiving, at an intermediate network device in a service provider network, a network request from a client device;
modifying, at the intermediate network device, the network request to include a network identifier; and
transmitting, from the intermediate network device, the network request to a server device located outside the service provider network;
wherein modifying the network request comprises:
selecting the network identifier from a set of available network identifiers, wherein a different network identifier is associated with each network request;
generating, for the received network request, a mapping between the selected network identifier and data originating from the service provider network,
wherein the set of available network identifiers comprises network identifiers that are not associated with an active mapping at a time of selection,
wherein the mapping is configured to persist for a predefined time period following receipt of the network request, and
wherein the selected network identifier is returned to the set of available network identifiers on expiry of the predefined time period,
such that there is no correlation between a network identifier and a network request or data originating from the service provider network outside of the mapping; and
configuring a data broker accessible from outside the service provider network based on the mapping, the data broker being configured to transmit at least a portion of the data originating from the service provider network based on the mapping within the predefined time period.

2. The method of claim 1, wherein configuring the data broker comprises:
transmitting, over a secure communication channel between the intermediate network device and the data broker, the mapping and at least a portion of the data originating from the service provider network,
wherein the mapping and the portion of the data originating from the service provider network are stored in a data storage device accessible to the data broker for use in transmission to the server device, and
wherein the mapping and the portion of the data originating from the service provider network are removed from the data storage device following expiry of the predefined time period.

3. The method of claim 2, wherein the portion of the data originating from the service provider network is anonymised.

4. The method of claim 1, wherein the mapping comprises an entry in a look-up table that associates the network identifier with a subscriber identifier, the subscriber identifier being used as an index in the data originating from the service provider network, and wherein the method comprises:
removing the entry in the look-up table following expiry of the predefined time period.

5. The method of claim 1, comprising:
determining a subscriber identifier from the received network request, including using network data that is accessible within the service provider network, said network data not being accessible from outside of the service provider network; and
using the subscriber identifier to retrieve data associated with a subscriber from at least one database accessible within the service provider network, said database not being accessible from outside of the service provider network.

6. The method of claim 5, wherein modifying the network request comprises:
retrieving a consent variable for the subscriber from the at least one database accessible within the service provider network,
wherein the network request is only modified if the consent variable indicates that consent has been provided.

7. The method of claim 1, wherein the network request comprises an application protocol request and the network identifier comprises a random fixed-length string that is inserted into the application protocol request.

8. The method of claim 1, wherein the data broker is configured to transmit said portion of the data originating from the service provider network and the network identifier to a data provision end-point associated with the server device.

9. The method of claim 1, wherein the data broker is configured to receive a request from the server device comprising the network identifier and to transmit said portion of the data originating from the service provider network in response to the request.

10. A method of providing data originating within a service provider network, a subscriber being authenticated to communicate over the service provider network using a client device, the method comprising:
    receiving, at a data broker, at least a mapping between a first network identifier and data originating within the service provider network, the mapping being associated with a particular network request made by the client device;
    storing, in data storage communicatively coupled to the data broker, the mapping for a predefined time period,
    wherein, following expiry of the predefined time period, the mapping is removed from the data storage, and
    wherein the first network identifier is selected from a set of available network identifiers that are not associated with an active mapping at a time of selection and wherein the first network identifier is configured to be returned to the set of available network identifiers on expiry of the predefined time period,
    wherein a different network identifier is associated with each network request,
    such that there is no correlation between a network identifier and a network request or data originating from the service provider network outside of the mapping;
    obtaining, at the data broker, a data request from a server device located outside of the service provider network, the data request comprising at least a second network identifier;
    applying, at the data broker, the mapping to the second network identifier and, responsive to the second network identifier matching the first network identifier and a current time being within the predefined time period, retrieving the data originating within the service provider network based on the mapping; and
    transmitting, from the data broker, at least a portion of the data originating within the service provider network to the server device.

11. The method of claim 10, wherein receiving, at a data broker, at least a mapping between a first network identifier and data originating within the service provider network comprises:
    receiving a data structure comprising the first network identifier and the data originating within the service provider network, the data structure having the first network identifier as an index; and
    wherein applying the mapping comprises:
    using the second network identifier to perform a look-up operation on the data structure,
    wherein, responsive to the second network identifier correlating to the first network identifier, the data originating within the service provider network is returned by the look-up operation, and
    wherein, responsive to the second network identifier not correlating to the first network identifier, the data originating within the service provider network is not returned by the look-up operation.

12. The method of claim 10, wherein obtaining the data request comprises:
    authenticating the server device,
    and wherein transmitting at least a portion of the data originating within the service provider network to the server device comprises:
    retrieving a registered data format associated with the server device; and
    formatting the portion of the data according to the registered data format.

13. The method of claim 12, comprising:
    registering the server device with the data broker, including storing an indication of one or more data items that are requestable by the server device,
    wherein the server device is one of a plurality of server devices that are registered with the data broker and the data originating within the service provider network comprises a set of data items that are indicated as being requestable by the plurality of server devices.

14. Apparatus for modifying a network request,
    the apparatus being located within a service provider network operated by a service provider responsible for providing telecommunications services to a plurality of client devices operated by authenticated subscribers,
    the apparatus being communicatively coupled to the plurality of client devices and one or more server devices outside of the service provider network,
    the apparatus comprising at least one processor and at least one memory including computer program code, the computer program code being configured to, when executed by the at least one processor, cause the apparatus at least to:
    receive, from one of the plurality of client devices, a network request;
    modify the network request to include a network identifier; and
    transmit the network request to one of the one or more server devices outside of the service provider network,
    wherein the computer program code is further configured to cause the apparatus to:
    select a network identifier from a set of available network for use with each received network request, wherein a different network identifier is associated with each network request;
    generate, for each received network request, a mapping between the selected network identifier and data originating from the service provider network; and
    configure a data broker accessible from outside the service provider network based on the mapping,
    wherein the set of available network identifiers comprises network identifiers that are not associated with an active mapping at a time of selection,
    wherein each mapping is useable for a predefined time period following receipt of a corresponding network request,
    wherein a selected network identifier is returned to the set of available network identifiers on expiry of the predefined time period,
    such that there is no correlation between a network identifier and a network request or data originating from the service provider network outside of the mapping, and
    wherein the data broker is configured to transmit at least a portion of the data originating from the service provider network to a data provision end-point associated with said one of the server devices based on the mapping within the predefined time period.

15. The apparatus of claim 14, wherein the service provider network comprises one or more of:
    a carrier network;
    a mobile network;
    a cellular network; and
    an internet service provider network.

16. Apparatus for providing data originating within a service provider network, the service provider network being operated by a service provider responsible for providing telecommunications services to a plurality of client devices operated by authenticated subscribers, the apparatus being communicatively coupled to one or more server devices that are located outside of the service provider network, the apparatus comprising:

a first interface to receive data associating network requests to data originating within the service provider network, a data storage device to cache data received at the first interface;

a second interface to receive data requests from the one or more server devices located outside of the service provider network; and a request handler to parse data requests received at the second interface to extract, for each data request, at least a network identifier, wherein each item of data received at the first interface indicates a relationship between a network identifier assigned to a given network request and data originating within the service provider network, the data being associated with a given subscriber that is registered with a client device that transmitted the given network request, wherein a different network identifier is associated with each network request, such that there is no correlation between a network identifier and a network request or data originating from the service provider network outside of the relationship, wherein the apparatus is configured to persist each item of said data for a predefined time period in the data storage device, and wherein the request handler is configured to use, for each data request, the extracted network identifier in association with cached data stored in the data storage device to determine whether data originating within the service provider network is available that relates to the extracted network identifier, wherein responsive to data originating within the service provider network being available the request handler is configured to response to a data request with said data originating within the service provider network.

17. The apparatus of claim 16, wherein the request handler is configured to filter the data originating within the service provider network based on a server device associated with a given data request.

18. The apparatus of claim 16, wherein the network identifier is a random data sequence that does not carry information.

19. A non-transitory computer readable medium comprising a set of computer-readable instructions stored thereon which, when executed by at least one processor, cause the at least one processor to:

receive a network request from a client device;

modify the network request to include a network identifier, including to:

select the network identifier from a set of available network identifiers, wherein a different network identifier is associated with each network request;

generate, for the received network request, a mapping between the selected network identifier and data originating from a service provider network, wherein the set of available network identifiers comprises network identifiers that are not associated with an active mapping at a time of selection, wherein the mapping is configured to persist for a predefined time period following receipt of the network request, and wherein the selected network identifier is returned to the set of available network identifiers on expiry of the predefined time period, such that there is no correlation between a network identifier and a network request or data originating from the service provider network outside of the mapping; and configure a data broker accessible from outside the service provider network based on the mapping, the data broker being configured to transmit at least a portion of the data originating from the service provider network based on the mapping within the predefined time period; and transmit the network request to a server device located outside the service provider network.

* * * * *